US005845897A

United States Patent [19]

Tunkers

[11] Patent Number: 5,845,897

[45] Date of Patent: Dec. 8, 1998

[54] TOGGLE LEVER CLAMP DEVICE FOR AUTOMOBILE BODY FABRICATION

[75] Inventor: Josef-Gerhard Tunkers, Ratingen, Germany

[73] Assignee: Tunkers Maschinenbau GmbH, Germany

[21] Appl. No.: 842,829

[22] Filed: Apr. 17, 1997

[30] Foreign Application Priority Data

Apr. 25, 1996 [DE] Germany ........................ 196 16 441.9

[51] Int. Cl.[6] ........................................ B23Q 3/08

[52] U.S. Cl. ................................ 269/32; 269/28; 269/30; 269/903

[58] Field of Search ................................ 269/32, 34, 30, 269/24, 228, 903

[56] References Cited

U.S. PATENT DOCUMENTS

| | | | |
|---|---|---|---|
| 3,371,953 | 3/1968 | Blatt . | |
| 3,482,831 | 12/1969 | Blatt . | |
| 4,635,911 | 1/1987 | Lovrenich | 269/93 |
| 4,664,364 | 5/1987 | Lymburner | 269/93 |
| 4,905,973 | 3/1990 | Blatt . | |
| 5,072,652 | 12/1991 | Blatt . | |
| 5,201,838 | 4/1993 | Roudaut . | |
| 5,503,378 | 4/1996 | Schauss et al. | 269/34 |

FOREIGN PATENT DOCUMENTS 256 208 A2 2/1988 European Pat. Off. .

*Primary Examiner*—James G. Smith
*Assistant Examiner*—Lee Wilson
*Attorney, Agent, or Firm*—Brinks Hofer Gilson & Lione

[57] ABSTRACT

A toggle lever clamp device for automobile body fabrication comprises a clamp housing (1) having a rectangularly shaped cross section wherein the cross-section is taken at a right angle to an axial direction of the housing. The housing is comprised of two parts (12, 13) and has a slot (19) on a rear side thereof that extends in the axial direction. The toggle lever clamp device further includes a cylinder (2) coupled to an end of the housing in the axial direction, a piston (6) axially located in the cylinder so that pressure can be exerted alternately on either side thereof, a piston rod (7) coupled to the piston (6) and extending axially through a part of the cylinder (2) and into a hollow space in the clamp housing (1); and a toggle lever joint arrangement (10) secured to a free end of the piston rod (7). An integral replaceable monitoring cassette (20) forms a cover in the area of a slot (19). The monitoring cassette (20) has a "T" shape including a mounting rail and a flange (25) to which an extending section (21) attaches with its longitudinal axis parallel to a longitudinal axis (18) of the piston rod. The monitoring cassette (20) further comprises a printed circuit board and an adjustable sensor means (22, 23) integrally mounted thereon so that the adjustable sensor means (22, 23) is responsive to the position of the piston rod (7). The monitoring cassette (20) is inserted into the slot (19) while retaining an ability to attach the clamp housing from all four sides, including the rear side, such that the section (21) seals the slot (19) as tightly as possible.

8 Claims, 2 Drawing Sheets

TOGGLE LEVER CLAMP DEVICE FOR AUTOMOBILE BODY FABRICATION

BACKGROUND OF THE INVENTION

The present invention relates to a toggle lever clamp device, and in particular a toggle lever clamp device for use in the manufacturing of automobile bodies.

Toggle lever clamp devices are known in the prior art. One such device is the subject of DE 93 11 132.0 U1 (assigned to the assignee of the present application) and European patent application 0-636 449 (94 105 296.1-2302) having the same subject matter. In the aforementioned European application, an embodiment of FIG. 1 has no slot, while in the embodiment of FIG. 8 of the European application, the cassette is mounted from the side.

A clamp device to tighten work pieces is also known from DE 92 15 151.5 U1. The device in this German application comprises a fork-shaped head piece supporting a swivel-mounted clamp arm which touches the end of a moveable regulating rod of the appliance's drive mechanism, wherein end position monitoring switches are placed within the regulating area of and adjacent to the end of the regulating rod and the axle journal for the regulating rod's contact rollers is extended at the end of the regulating rod and forms the position indicator which protrudes into an elongated slot extending parallel to the regulating rod in the field of the end position detecting element, wherein the head piece is provided with a shallow recess on the exterior flank of one of its fork pieces towards the regulating area of the end of the regulating rod and open to the exterior, wherein at least one end position monitoring switch having two end position detecting elements is placed in this recess open to the exterior and the recess with the end position monitoring switches in it is closed with a detachable cover plate attached to the head piece. The latter construction requires the cumbersome fabrication of hollow spaces in which the switches can be placed and the fitting of special cover plates. In the event of disturbances first the cover plate must be removed and the switches mounted in the hollow spaces must be detached and replaced. Arranging these hollow spaces is expensive, while replacing defective switches and their installation is very time consuming.

A clamping device with a steering device, a clamp arm, end position monitoring devices and a drive regulating rod with which the clamp arm may be directly or indirectly swung horizontally between the fixed end positions of the end position monitoring elements is known from DE-U-90 16 781.3. The end position monitoring elements are placed in a separate detachable casing connected to the clamping device adjacent to an axially positioned adjustable detecting rod with position indicator, which detecting rod extends parallel to a connecting flange of the casing and the upper end of which extends outside the casing, between which casing and the regulating rod a driving tie-bar is positioned axially. The end position monitoring elements are placed in adjustable relationship to the position indicator. This clamping device is supported and swiveling with clamp arm in a fork-shaped head piece placed on a drive mechanism. The casing is placed with its casing-connecting flange on the side with the clamp arm or the side of the device away from the clamp arm, wherein the driving tie-bar extends between the fork tines of the head piece from the guide rod to the regulating rod. There is a longitudinal slot parallel to the regulating rod on the side of at least one of the head piece's fork tines and the casing is placed on the longitudinal slot side of the device, wherein the driving tie-bar extending between the upper end of the guide rod and the regulating rod extends through the longitudinal slot. The regulating rod revolves simultaneously with the clamp arm of the drive mechanism and is movable in the direction of the axle. The casing is placed on one of the two sides of the device on the far side of the swiveling range, wherein the driving tie-bar is connected to either the regulating rod and/or the clamp arm so that it can rotate. The terminal end of the driving tie-bar facing the regulating rod is formed like a fork.

A toggle lever clamp device for tightening work pieces, specifically automobile body components, comprising a body jack with double-acting pistons and piston rods is known from DE 30 22 376 C2, the end of which has a head piece which is guided into a guide piece attached axially to the body jack and which is connected via a hinged connecting link to a clamping lever supported on a lateral articulated joint on the guide rod and is propped up on the guide piece via a flat guide, wherein this flat guide rests in a plane parallel to a plane running through the piston rod axis and placed on the side facing away from the articulated joint of the clamping lever. The flat guide is placed on an interior side of the guide rod facing the articulated joint and at a maximum distance from the piston rod axis. A stroke limiter control element is placed on the free end of the guide piece near the flat guide.

Although the above examples of the prior art have shown various ways to provide a clamping mechanism, there still exits a need for improvement. Accordingly, it is an object of the present invention is to provide an improved toggle lever clamp device of the type shown in the aforementioned prior art patents.

SUMMARY OF THE INVENTION

The present invention relates to a toggle lever clamp device, in particular for use in the fabrication of automobile bodies for the automotive industry. It disclosed that a monitoring cassette can be integrated in the casing through a small slot in the rear, so that the toggle lever clamp can be affixed from four sides if desired. Furthermore, play in the toggle lever joint arrangement can be equalized on a stopper in an infinitely variable manner and also the tension jack may be released manually, such as in the event of loss of power or the like, even after operating to the top dead center position.

A toggle lever clamp device for automobile body fabrication comprises a clamp housing has a rectangularly shaped cross section wherein the cross-section is taken at a right angle to an axial direction of the housing. The housing is comprised of two parts and has a slot on a rear side thereof that extends in the axial direction. The toggle lever clamp device further includes a cylinder coupled to an end of the housing in the axial direction, a piston axially located in the cylinder so that pressure can be exerted alternately on either side thereof, a piston rod coupled to the piston and extending axially through a part of the cylinder and into a hollow space in the clamp housing; and a toggle lever joint arrangement secured to a free end of the piston rod. An integral replaceable monitoring cassette forms a cover in the area of a slot. The monitoring cassette has a "T" shape including a mounting rail and a flange to which an extending section attaches with its longitudinal axis parallel to a longitudinal axis of the piston rod. The monitoring cassette further comprises a printed circuit board and an adjustable sensor means integrally mounted thereon so that the adjustable sensor means is responsive to the position of the piston rod. The monitoring cassette is inserted into the slot while retaining an ability to attach the clamp housing from all four sides, including the rear side, such that the section seals the slot as tightly as possible.

BRIEF DESCRIPTION OF THE DRAWINGS

An embodiment of the present invention is illustrated by way of example, in part schematically, in the drawings of which the following are shown.

DETAILED DESCRIPTION OF THE PRESENTLY PREFERRED EMBODIMENTS

Figure 1:
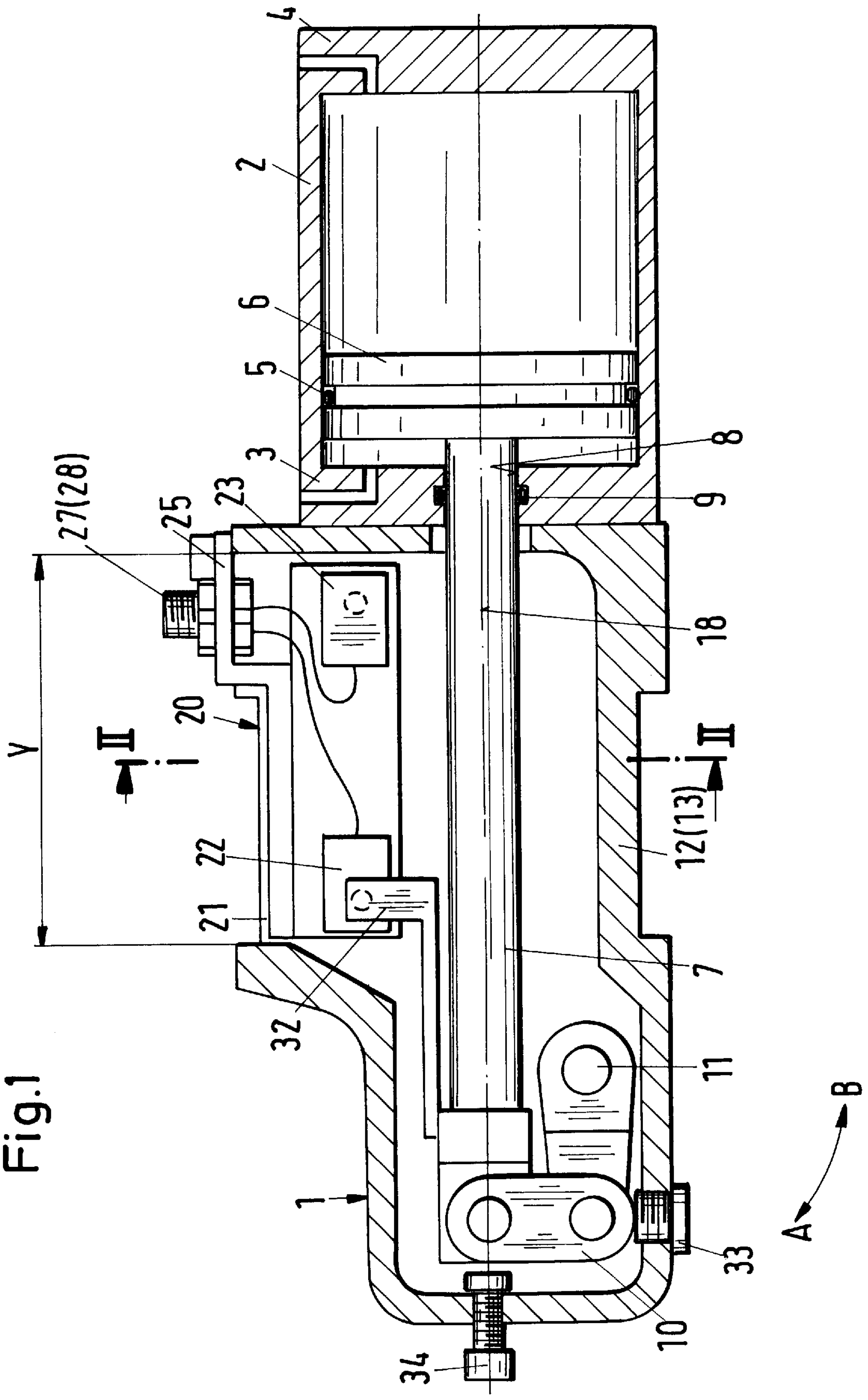
FIG. 1 is a toggle lever clamping device, specifically for automobile body fabrication, in axial longitudinal view.
Figure 4:
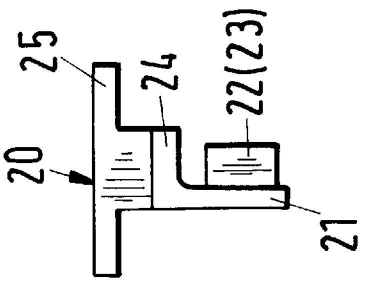
FIG. 4 is a left frontal view of FIG. 3.
Figure 3:
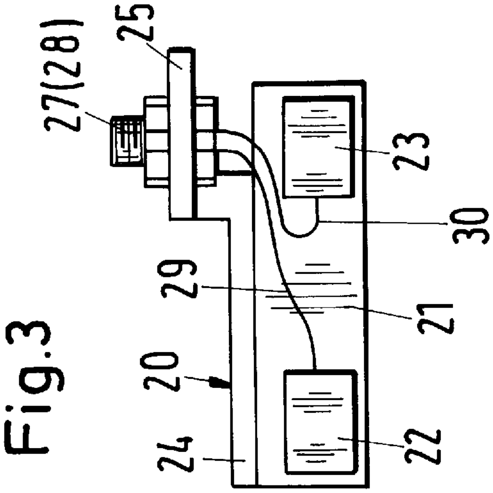
FIG. 3 is a side view of a monitoring cassette.

Reference numeral 1 shows a clamp head to which a cylinder 2 is attached axially to resist pressure. The cylinder 2 is bounded by a cover 3 on the end facing the clamp head and on its opposite face by a bottom cover 4. In the cylinder 2 a piston 6 is inserted lengthwise via a seal 5 lengthwise and piston 6 is impervious and is connected to a piston rod 7. The piston rod 7 penetrates a bore hole 8 in the cover 3 and is sealed against pressure with a seal 9.

The piston rod 7 penetrates the clamp head 1 in an axially direction and is connected on its end to a toggle lever joint arrangement 10, which is associated to a clamp arm that is not described further. The clamp arm is placed in direction A or B at a certain angle of opening around an axis 11 fixed to the casing while still capable of swiveling. The angle of opening can be obtuse-angled.

Figure 2:
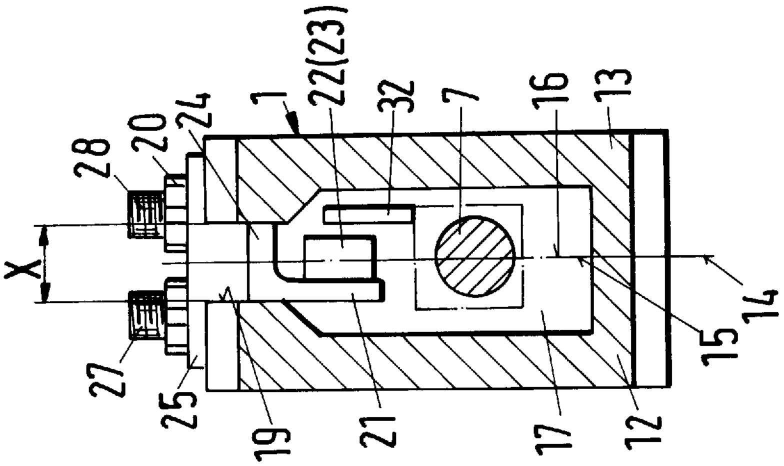
FIG. 2 is a cross-section of line II—II of FIG. 1.

The clamp head 1 has a casing comprising in the illustrated embodiment two shell-shaped casing pieces 12 and/or 13 as shown in FIG. 2 which rest upon each other sandwich-like and with no gaps and which thereby encapsulate the piston rod 7, the toggle lever joint arrangement 10 and all other articles located between the casing pieces 12 and 13 from dirt and moisture.

The casing pieces 12 and 13 are separated from each other by a dividing plane 14 (FIG. 2) running in a straight line so that the casing pieces 12 and 13 rest flatly each other along the walls 15 or 16. The casing pieces are connected to each other by a removable screw (not described further). If needed, sealing elements can be associated to the walls (not shown).

The casing pieces 12 and 13 are closed on all sides and have only one indentation each on a side shaped like a semicircle (not shown) which complement each other to form a bore hole through which the piston rod 7 protrudes through the casing pieces 12 and 13 into the limited space 17. The toggle lever joint arrangement 10 is also placed in this space 17. The end of the piston rod 7 within the space 17 and the toggle lever joint arrangement 10 are thus encapsulated from exterior dirt, dust and splashing liquids. Both shell-shaped casing pieces 12 and 13 have a bore hole (not shown) that passes through them orthogonally through which axis 11 penetrates. Alternatively, the axis 11 can also be supported by recesses in the relevant casing pieces 12 or 13 that do not penetrate through to the exterior. Further, the two shell-shaped casing pieces 12 and 13 have guide notches (not shown). The guide notches can be formed identically and correspond to each other when the casing pieces 12 and 13 are joined together so that the toggle lever joint arrangement 10 with associated components is guided in a longitudinal direction. Furthermore, the casing pieces 12 and 13 have bore holes for screws which are not shown, by means of which the casing pieces 12 and 13 can be screwed together to be in a sealed joint. For example, the bore holes in one casing piece can be formed as bore holes extending through the casing piece, while the bore holes placed on the other casing piece associated coaxially to it are pocket holes with screw threads. By screwing in screw bolts that are not shown, the casing pieces 12 and 13 can be firmly joined to each other while remaining detachable. The casing pieces 12 and 13 can be made of steel or aluminum or another suitable materials, for example from injection moulded material. The walls 15, 16 on the dividing plane 14 can be given a high quality finish, for example polished or cast with a corresponding surface material so that they rest flush and tight upon each.

The toggle lever joint arrangement 10 can be associated with fork arms (not shown) which are attached to the axis 11 and with ends whose terminal sections are quadratic or polygon-shaped when viewed in cross section. A retaining axis can be provided here which grabs against the fork-shaped end of the associated fork arm and surrounds the terminal section of the screw bolt with appropriately shaped recesses and which is attached to the respective fork arm with screws (also not shown).

The fork arm can also be associated with a screw-on piece that is attached concentrically or eccentrically in relation to the fork arm.

As can be seen in FIG. 2, the casing of the clamp head 1 is formed in a square shape viewed in cross section orthogonally to the longitudinal axis 18 of the piston rod 7. Thus the casing can in principle be mounted on all four sides, for instance screwed on, namely on the respectively square sides as desired facing the device parts, for instance in body fabrication in the automobile industry.

It can be seen in FIG. 2 that in the area of the narrow side of a square-shaped basic form of the casing a slot 19 of X width is placed, which (FIG. 1) stretches approximately over the length Y and in which a monitoring cassette 20 is placed. This monitoring cassette 20 comprises essentially an L-shaped section 21 in cross-section orthogonally in relation to the longitudinal axis 18 of the piston rod 7, which is formed as a mounting rail and which has switches 22 or 23 attached with some distance between them, which may be formed as microswitches, inductive switches, limit switches, or pneumatic switches and which are variably attached and locked in the longitudinal axis of the L section 21, according to the desired operational conditions. As can be seen, these switches 22 and 23 are affixed to the leg of the L section 21 running parallel to the dividing plane 14, while the lateral leg 24 running orthogonally thereto is attached in slot 19 and seals the latter as tightly as possible and thereby seals the space 17 here too from the exterior. The lateral leg 24 extends over the length Y (FIG. 1) of slot 19.

Figure 5:
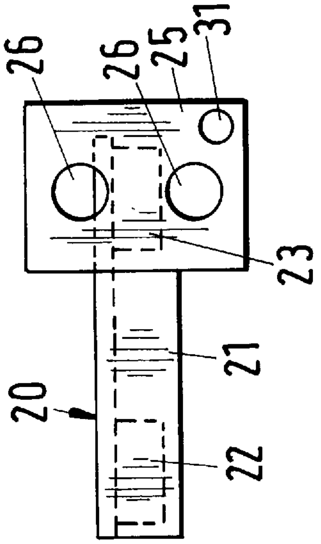
FIG. 5 is a top view of FIG. 3.

A flange 25 is connected as a single piece in an appropriate manner to the L-shaped section 21, which flange has two through bore holes 26 (FIG. 5) for attaching the feeds 27 or 28 for electrical cables 29 or 30 which are connected to the switches 22 and 23. The flange 25 also has a through bore hole 31 through which a screw that is not shown penetrates, by means of which the monitoring cassette 20 is affixed interchangeably to the L section 21. A plurality of bore holes may be provided and therewith a plurality of screws (not shown.)

As can be seen, connected to the piston is a control flag 32 which is placed the distance of a gap away from switches 22 and 23 and which scans the latter with the back and forth movement of piston rod 7, thereby setting off control functions. It can be clearly seen in FIG. 1 that the monitoring cassette 20 with the L-shaped section 21 lies within the contours of the casing so that it does not interfere outside that. Only the feeds 27 and 28 extend beyond the projection. The flange 25 is also placed on the exterior of the casing 1. That also provides the possibility, however, of mounting the toggle lever clamp device on any part of a device from this side as well, that is, from the rear. Of course, this can also be done on the opposite side and on both of the longitudinal sides of the square-shaped casing that face each other, so that the toggle lever clamp device can be mounted and affixed on four sides as desired. According to the present embodiment, the monitoring cassette 20 is thus inserted into the rear of the casing in slot 19 and affixed and does not interfere in any way, so that the toggle lever clamp device—as mentioned—can also be affixed on the rear side. The cassette technology is thus easy to service since the complete monitoring cassette 20 with completely cabled switches and plugs can be replaced by loosening one screw.

The limit stop of the toggle joint arrangement 10 is adjusted with the thread plug 33. At its end point, that is, when the damper is closed and simultaneously operated to top dead center, the toggle lever joint arrangement 10 runs against the thread plug 33 in order to bring the clamp arm into an absolutely fixed position with no play. As can be seen, this thread plug 33 is adjustable from the outside and therefore easy to install and service in order to be able to equalize any variations in the joint parts.

Reference numeral 34 refers to an adjusting screw which is also accessible from the outside. Mounting a toggle lever clamp device of the construction illustrated requires an exact method in order to ensure that the gripping power is in fact guaranteed after the clamp arm has been installed. In order to achieve this the adjusting screw 34 is completely screwed down to the block when it leaves the manufacturer's plant. At this position of the screw, the clip of the toggle lever joint arrangement 10 is placed at a 12 degree angle. After the thrust piece on the clamping arm has been attached, which will later act upon the work piece, the adjusting screw 34 is unscrewed up to another limit stop. The toggle lever clamp device can now be operated to the top dead center using the corresponding pressure capacity of the piston 6, that is, unleashing its maximum gripping power. With the adjusting screw 34, for example with a loss of power, by screwing in the adjusting screw 34 the toggle lever clamp device can be easily retracted from top dead center in order to facilitate manually opening or backing up the tension jack. The adjusting screw 34 also is used to install the clamp arm and to achieve gripping power.

The disclosed embodiment of the invention provides a toggle lever clamp device in such a way that it may be mounted not only on the rear but rather on all four sides of the device's components, while retaining the known advantages of cassette technology.

In a preferred embodiment of the invention a monitoring cassette has a roughly "L" shaped form in a sectional view orthogonal to the longitudinal axis of the piston rod, on the end of which a single-piece flange running orthogonally to the longitudinal axis of the "L" adjoins, with which the monitoring cassette is screwed on to the casing, covering the slot-shaped recess.

According to another embodiment of the invention, a rail of the monitoring cassette extends in the longitudinal direction of the piston rod, that is running parallel to it. The end switches, microswitches, inductive switches or sensors are attached to this rail at variable positions and are stabilized by a control flag associated to the piston rod, i.e. scanned when the piston rod is shifted and thus setting off the various sequential phase controls.

Fitting a toggle lever clamp device on a device, for example for fabricating automobile bodies in the automobile industry, requires an exact method in order to ensure that gripping power is guaranteed after the clamp arm has been installed as well. To achieve this according to a present embodiment, a screw in the toggle lever clamp device in its condition at the time of delivery is screwed down up to the block. As a result of this positioning of the screw, the toggle lever clamp's clip is placed at an angle of about 12 degrees. Then after the thrust piece has been attached to the clamp arm, the screw is unscrewed all the way up to the limit stop. Thereafter the toggle lever clamp device can be operated to the top dead center by means of pressure, for instance pneumatic pressure, thereby unleashing the full gripping power. By screwing in this screw as needed, the toggle lever clamp device can also be retracted from this top dead center in order to facilitate manually opening or backing up the toggle lever clamp device. Thus the screw is used to install the clamp device and to achieve gripping power, as well as to retract the toggle lever clamp device from the dead center or top dead center.

In one embodiment, there is provision for a thread plug that is set as a further limit stop on the toggle lever joint. In final position, that is, when the toggle lever clamp device is closed, which as a rule also corresponds to top dead center, the toggle lever joint runs against a stopper, here against a thread plug, in order to thereby put the clamp arm in an absolutely fixed position free of any play. The thread plug can be adjusted from the outside and is therefore easy to adjust in order to equalize any variations in the joint parts.

In the clamping device according to a present embodiment, the monitoring cassette is inserted into the casing from the rear of the clamp casing through a narrow, slot-shaped recess. Thus, the monitoring cassette has a thin design and contains the sensors, the plugs that are cabled together and any fastening nuts or screws. Although the monitoring cassette is inserted into the rear in a slot-shaped recess in the casing, this method of affixing located here can be used fully, i.e. the toggle lever clamp device can also be mounted on this side. The toggle lever clamp device can thus be mounted on the rear as well, or brackets, mountings, etc. located there may be screwed down. In a present embodiment, any end switches, microswitches, inductive switches, sensors or the like are variably placed, in order to adjust various angles of opening, strokes, or the like. This cassette technology is very easy to service because by loosening only one screw, for instance, the complete monitoring cassette with switches and plugs which are completely cabled together can be replaced. Thus completely interchangeable monitoring cassettes can be kept in stock which can then be replaced with a flick of the wrist. Thus only brief downtime can be expected if it should become necessary to replace the monitoring cassette.

It is intended that the foregoing detailed description regarded as illustrative rather than limiting and that it is understood that the following claims including all equivalents are intended to define the scope of the invention.

I claim:

1. A toggle lever clamp device for automobile body fabrication comprising:

a clamp housing (1) having a rectangularly shaped cross section wherein said cross-section is taken at a right angle to an axial direction of said housing, and further wherein said housing is comprised of two parts (12, 13) and further wherein said clamp housing has a slot (19) on a rear side thereof that extends in said axial direction;

a cylinder (2) coupled to an end of the housing in said axial direction;

a piston (6) axially located in said cylinder so that pressure can be exerted alternately on either side thereof;

a piston rod (7) coupled to said piston (6) and extending axially through a part of said cylinder (2) and into a hollow space in the clamp housing (1); and a toggle lever joint arrangement (10) secured to a free end of the piston rod (7);

an integral replaceable monitoring cassette (20) having a "T" shape including a mounting rail and a flange (25), to which an extending section (21) attaches with its longitudinal axis parallel to a longitudinal axis (18) of the piston rod, wherein said monitoring cassette (20) forms a cover in the area of a slot (19);

wherein said monitoring cassette (20) further comprises a printed circuit board and an adjustable sensor means (22, 23) integrally mounted thereon so that said adjustable sensor means (22, 23) is responsive to the position of the piston rod (7); and wherein the monitoring cassette (20) is inserted into said slot (19) while retaining an ability to attach the clamp housing from all four sides, including said rear side, such that the section (21) seals the slot (19) as tightly as possible.

2. The toggle lever clamp device according to claim 1, characterized in that the section (21) has an "L" shaped cross-section at a right angle to the longitudinal axis (18) of the piston rod (7), wherein the leg of the "L" runs parallel to the longitudinal axis (18) of the piston rod (7) while a lateral leg (24) closes the slot (19) from the outside.

3. The toggle lever clamp device according to claim 1 or 2, wherein said two parts (12, 13) rest flatly upon each other on one level and encase the toggle lever joint arrangement (10), the piston rod (7), and the adjustable sensor means (22, 23) from exterior dirt and dust, and further wherein the two parts (12, 13) on a narrower side of the clamp head (1) which is rectangularly shaped in cross-section define said slot (19) for placement of the monitoring cassette (20).

4. The toggle lever clamp device according to claim 2, wherein said two parts (12, 13) rest flatly upon each other on one level and encase the toggle lever joint arrangement (10), the piston rod (7), and the adjustable sensor means (22, 23) from exterior dirt and dust, and further wherein the two parts (12, 13) on a narrower side of the clamp head (1) which is rectangularly shaped in cross-section define said slot (19) for placement of the monitoring cassette (20).

5. The toggle lever clamp device according to claim 1 or 2 characterized in that the section (21) is inserted into the slot (19) so far that the narrower side of the rectangularly shaped in cross-section clamp head (1) rises above a wall defining an exterior boundary of said L-shaped section (21).

6. The toggle lever clamp device according to claim 2 characterized in that the section (21) is inserted into the slot (19) so far that the narrower side of the rectangularly shaped in cross-section clamp head (1) rises above a wall defining an exterior boundary of said L-shaped section (21).

7. The toggle lever clamp device according to claim 6, further comprising:

a limit stop (33) for the toggle lever joint arrangement (10) in a top dead center position and formed as a stopper to be operated from outside said housing (1) and adjustable in a direction of its longitudinal axis.

8. The toggle lever clamp device according to claim 7, characterized in that another adjustable limit stop (34) is placed on the front side of the clamp head (1) adapted to manually retract the toggle lever joint arrangement (10) from the top dead center position.

* * * * *